United States Patent
Baak et al.

(10) Patent No.: US 8,326,445 B2
(45) Date of Patent: Dec. 4, 2012

(54) MESSAGE STRING CORRESPONDENCE SOUND GENERATION SYSTEM

(76) Inventors: Saang Cheol Baak, Seoul (KR); Chang Joo Choi, Anyang-si (KR)

(*) Notice: Subject to any disclaimer, the term of this patent is extended or adjusted under 35 U.S.C. 154(b) by 1048 days.

(21) Appl. No.: 12/301,802

(22) PCT Filed: Jun. 26, 2006

(86) PCT No.: PCT/KR2006/002463
§ 371 (c)(1),
(2), (4) Date: Nov. 21, 2008

(87) PCT Pub. No.: WO2007/142375
PCT Pub. Date: Dec. 13, 2007

(65) Prior Publication Data
US 2010/0318202 A1  Dec. 16, 2010

(30) Foreign Application Priority Data
Jun. 2, 2006 (KR) .................... 10-2006-0049615

(51) Int. Cl.
*G06F 17/00* (2006.01)
(52) U.S. Cl. .......... 700/94; 709/206; 709/207; 704/235; 704/260; 715/716; 381/56; 381/58
(58) Field of Classification Search ............... 700/94
See application file for complete search history.

(56) References Cited

U.S. PATENT DOCUMENTS

| | | | |
|---|---|---|---|
| 6,453,294 B1* | 9/2002 | Dutta et al. | 704/270.1 |
| 6,990,452 B1 | 1/2006 | Ostermann et al. | |
| 2002/0110248 A1* | 8/2002 | Kovales et al. | 381/56 |
| 2002/0170415 A1* | 11/2002 | Hruska et al. | 84/609 |
| 2003/0046160 A1* | 3/2003 | Paz-Pujalt et al. | 705/14 |
| 2003/0120726 A1* | 6/2003 | Archibald et al. | 709/203 |
| 2004/0024822 A1* | 2/2004 | Werndorfer et al. | 709/206 |
| 2005/0071747 A1* | 3/2005 | Jaeger | 715/500.1 |
| 2005/0160149 A1* | 7/2005 | Durand et al. | 709/206 |
| 2005/0204309 A1* | 9/2005 | Szeto | 715/811 |
| 2007/0121918 A1* | 5/2007 | Tischer | 379/373.02 |
| 2007/0266090 A1* | 11/2007 | Len | 709/204 |

FOREIGN PATENT DOCUMENTS

| | | |
|---|---|---|
| CA | 2363978 A1 | 5/2003 |
| KR | 2004-0039771 A | 5/2004 |

OTHER PUBLICATIONS

International Search Report for PCT/KR2006/002463.

* cited by examiner

*Primary Examiner* — Paul McCord
(74) *Attorney, Agent, or Firm* — Rabin & Berdo, PC

(57) ABSTRACT

The invention relates to a system for generating various sounds corresponding to character strings resulting from an operation of an input device of a mobile communication terminal or computer terminal. The system comprises: a message input unit with which a character message to be transmitted is inputted in a transmitting terminal; a message setting unit that inputs a message to be transmitted to the message input unit and sets a type of the message as sound message; a user authentication unit that is connected to a communication network and confirms whether the user is a service subscriber or not when the message setting unit sets the message as sound message; a user database that is associated with the user authentication unit and stores information of the user therein; a sound generating means that, when the user is confirmed as a service subscriber by the user authentication unit, receives the message inputted through the message input unit to generate and transmit a sound corresponding to the received message to a receiving terminal; and a receiving terminal that receives the message and the sound transmitted from the sound generating means via the communication network.

4 Claims, 4 Drawing Sheets

MESSAGE STRING CORRESPONDENCE SOUND GENERATION SYSTEM

CROSS-REFERENCE TO RELATED APPLICATIONS

This application claims priority of PCT/KR2006/002463 filed Jun. 26, 2006 and Korean Application No. 10-2006-0049615 filed Jun. 2, 2006.

STATEMENT REGARDING FEDERALLY SPONSORED RESEARCH

Not Applicable.

BACKGROUND OF THE INVENTION

1. Field of Invention

The present invention relates to a system for generating a sound corresponding to a character string, and more particularly, to a system for generating various sounds, in a musicological and acoustically manner, corresponding to character strings resulting from an operation of an input device, such as a keyboard of a computer terminal or a keypad a mobile communication terminal.

2. Related Art

In text-based communication, such as a short message service (SMS) using a mobile communication terminal or a simple text through the Internet using a computer terminal, a variety of ways have been suggested so as to express emotions. For example, emoticons are used which are added before and behind a message, thereby expressing a current emotion of a sender. Further, a method of automatically changing an image that an Avatar is communicating has been also suggested.

However, according to the conventional text messaging, the message is expressed only by a simple text or a character or picture using an emoticon, so that it is difficult to sufficiently express a sender's intention.

In order to solve the above problem, a method of using sound-indicating symbol (i.e., sound emoticon) in a mobile communication character message has been provided in which a character message is transmitted with sound emoticon being inserted and the sound emoticon is automatically played when a receiver sees it, so that a sender's emotion can be simply and efficiently delivered to the receiver using the sound and symbol.

FIG. 1 is a flow chart showing a method of providing a sound emoticon in a character message in a mobile communication terminal. As shown in FIG. 1, in a mobile communication terminal having a memory in which sound emoticons are stored, while a user prepares a message using character, number key and the like provided to a key input unit of the terminal, the user selects a sound emoticon input mode by operating the keys of the terminal, thereby enabling the terminal to output the pre-stored sound emoticons on a display. When the user selects one of the sound emoticons outputted on the display using a movement key and an enter key provided to the key input unit, a control unit recognizes the operation, thereby enabling the selected sound emoticon to be inserted into the message being prepared.

When the message is completed, it is transmitted to a mobile communication terminal of a receiver.

According to the above method, the character and the sound are simultaneously outputted using the sound emoticon. However, the user should select the sound to be used and have a mobile communication terminal having the sound emoticon function.

SUMMARY OF THE INVENTION

The invention has been made to solve the above problems occurring in the prior art. An object of the invention is to provide a system for generating a sound corresponding to a character string, wherein not only a character inputted with a mobile communication terminal or computer terminal but also a music, sound and voice corresponding to the character are provided to deliver a sender's emotion reflecting a meaning that the sender intends to deliver, escaping an uninteresting text-based message.

Another object of the invention is to provide a system for generating sound contents, in which a user selects a sound corresponding to a character string, thereby making a melody and a music.

In order to achieve the above objects, there is provided a system for generating a sound wherein various sound sources are made to correspond to character strings, more particularly a system for generating various sounds, in a musicological and acoustically manner, corresponding to character strings resulting from an operation of an input device, such as a keyboard of a computer terminal or a keypad a mobile communication terminal.

As described above, according to the invention, when transmitting a message using a mobile communication terminal or computer terminal, a character of the message is made to correspond to a sound. When seeing the message with a receiving terminal, the sound is also provided. Accordingly, it is possible to simply and effectively deliver the emotion of the sender with the sound and character.

In addition, according to the invention, the characters having the sound associated therewith, rather than a simple character, are transmitted, thereby causing new interests to the users. Further, the general persons who have not been educated for the music are enabled to take an interest in music, musical instruments, acoustics and the like. Furthermore, breaking from the positive attitude of simply purchasing and listening the background music, it is possible to enable the users to take part in the music environments more actively.

Further, according to the invention, a system is provided which enables the users to participate in the multimedia environments more actively. Accordingly, instead of simply listening the music, it is possible to the users to directly select the melody and musical instrument with the characters, thereby generating the musical messages. As a result, it is helpful for the children or teenagers to develop the creativity and musicality.

Additionally, according to the invention, regarding the sound sources that are commercially provided, it is possible to provide the sound contents corresponding to the character strings in a conventional format, such as colorings or bell sounds. Therefore, it is possible to create a new profit for the sound sources having the copyrights.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the invention will be more specifically described with reference to the accompanying drawings.

Figure 1:
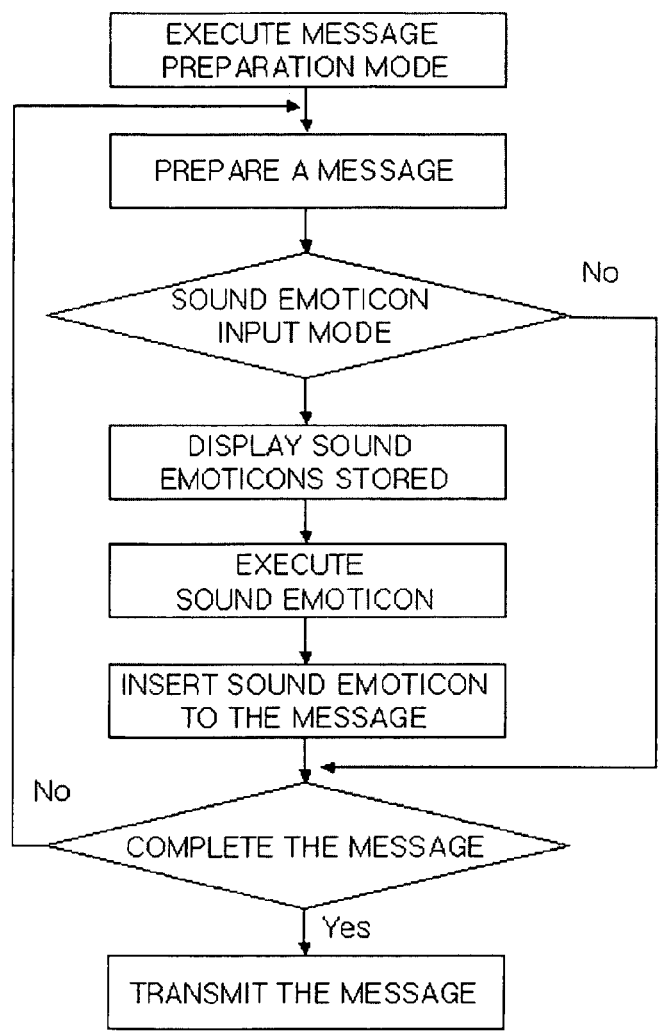
FIG. 1 is a flow chart showing a method of servicing a sound emoticon according to the prior art.
Figure 2:
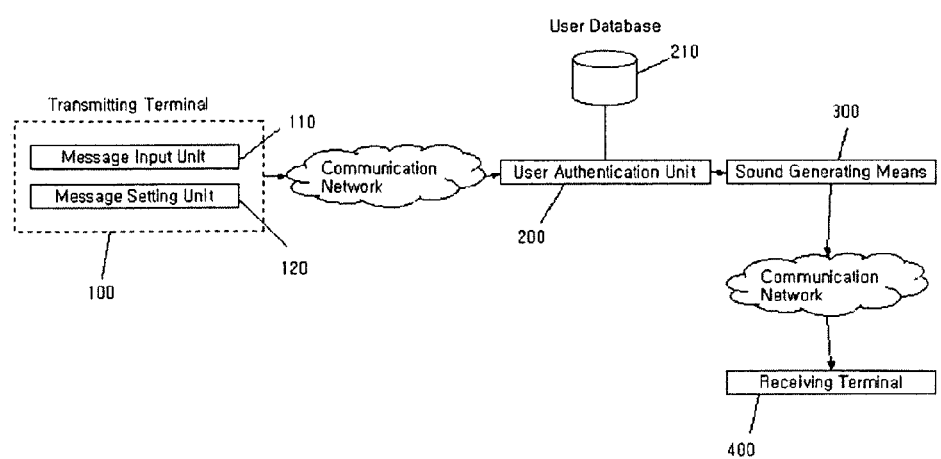
FIG. 2 is a block diagram showing an overall structure of a system for generating a sound corresponding to a character string according to an embodiment of the invention.

FIG. 2 is a block diagram showing an overall structure of a system for generating sound corresponding to a character string according to an embodiment of the invention.

As shown in FIG. 2, the system comprises a message input unit 110 with which a character message to be transmitted is inputted in a transmitting terminal 100; a message setting unit 120 that inputs a message to be transmitted to the message input unit and sets a type of the message as sound message; a user authentication unit 200 that is connected to a communication network and confirms whether the user is a service subscriber or not when the message setting unit 120 sets the message as sound message; a user database 210 that is associated with the user authentication unit 200 and stores information of the user therein; a sound generating means 300 that, when the user is confirmed as a service subscriber by the user authentication unit 210, receives the message inputted through the message input unit to generate and transmit a sound corresponding to the received message to a receiving terminal; and a receiving terminal 400 that receives the message and the sound transmitted from the sound generating means 300 via the communication network.

Figure 3:
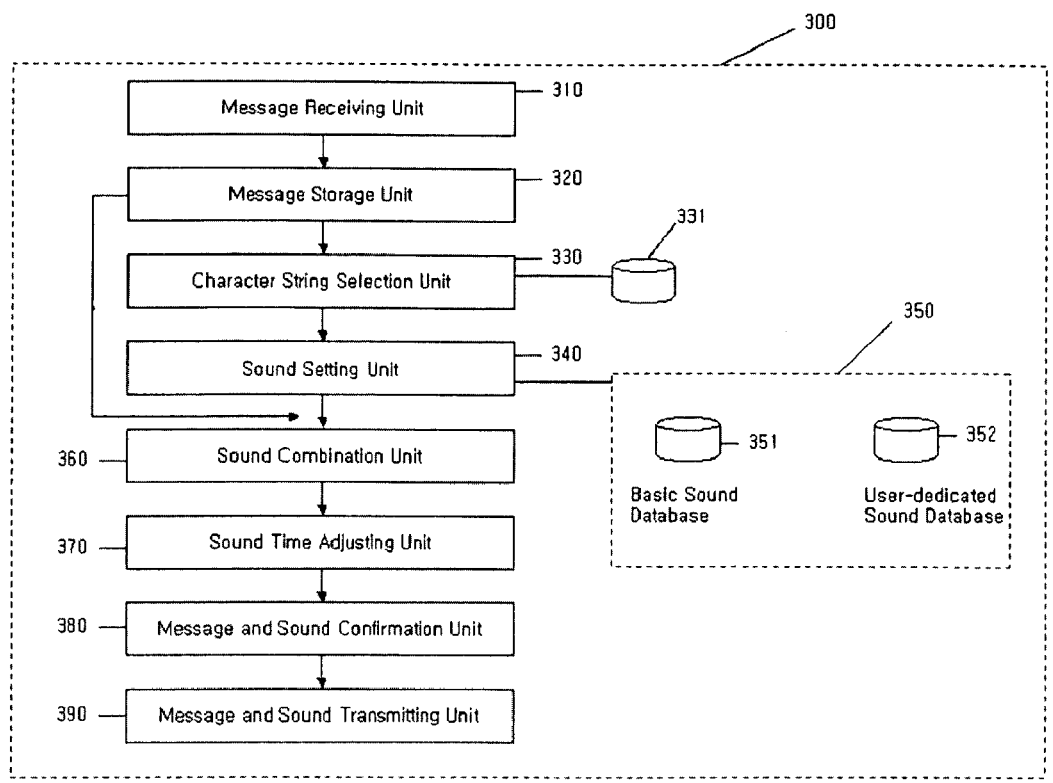
FIG. 3 is a block diagram showing a sound generating means of a system for generating a sound corresponding to a character string according to an embodiment of the invention.

FIG. 3 is a block diagram showing a structure of the sound generating means of the system for generating sound corresponding to a character string according to the invention.

As shown in FIG. 3, the sound generating means 300 that receives a message prepared in the transmitting terminal and matches the message with a sound comprises: a message receiving unit 310 that receives the message; a message storage unit 320 that stores the message received by the message receiving unit 310; a character string selection unit 330 that selects a character string that is able to be converted into a sound for a character stored in the message storage unit 320; a character string database 331 that stores information of character strings to be selected by the character string selection unit; a sound setting unit 340 that retrieves and sets a sound to be matched with the character string selected by the character string selection unit 330; a sound database 350 that stores a sound for the character string set by the sound setting unit 340; a sound combination unit 360 that combines the sound to be in order of the character string, the sound being set by the sound setting unit 340; a sound time adjusting unit 370 that calculates start time and duration time of an output of the sound combined by the sound combination unit 360; a message and sound confirmation unit 380 that enables a user to confirm, in a previously listening manner, the message and the sound having the output time adjusted by the sound time adjusting unit 370 so as to determine whether or not to transmit the message and sound; and a character and sound transmitting unit 390 that transmits the message and the sound, which are confirmed by the message and sound confirmation unit 380, to the receiving terminal.

In the followings, the constitution elements of the system for generating sound corresponding to a character string according to the invention will be described more specifically.

Figure 4:
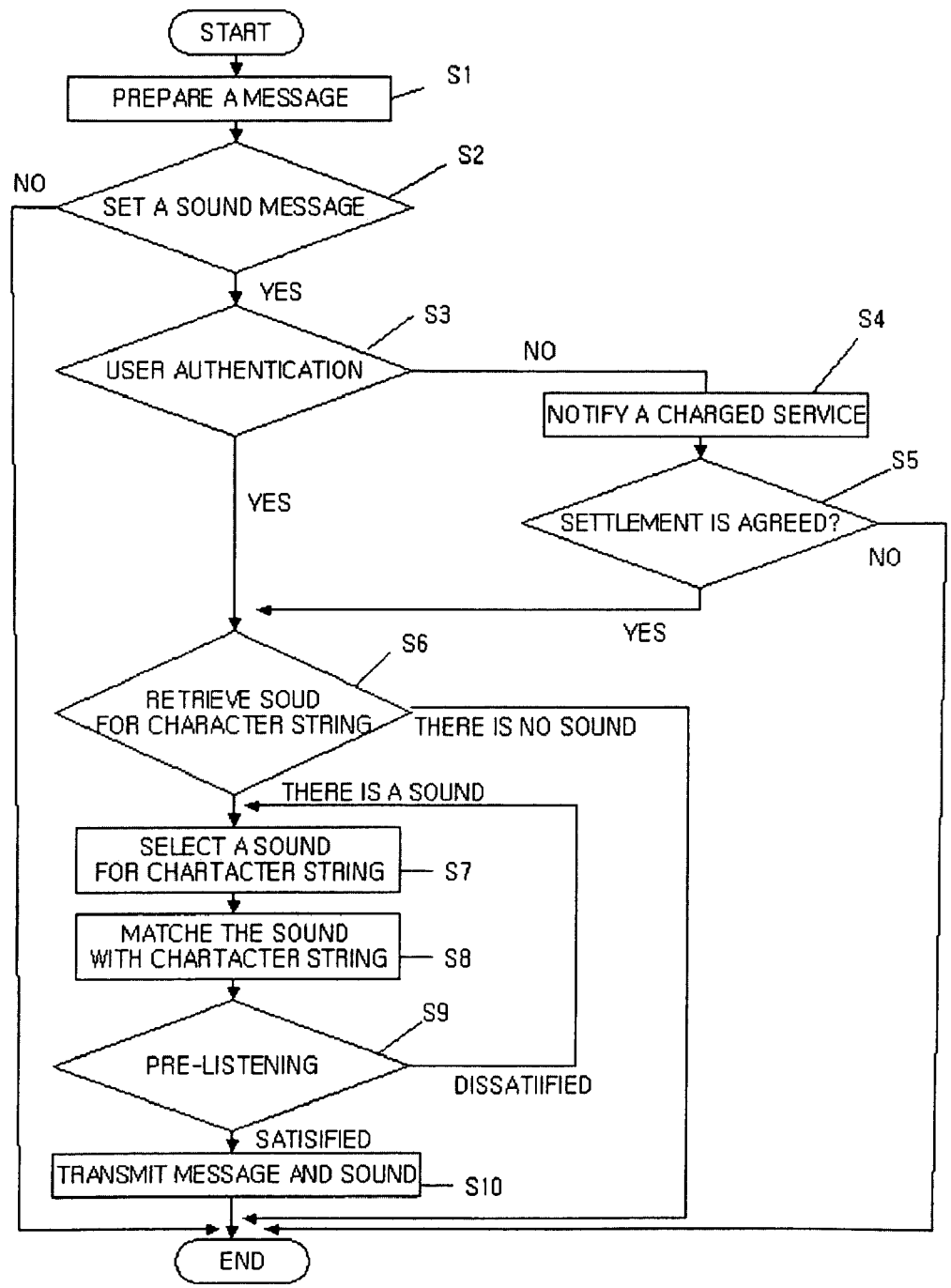
FIG. 4 is a flow chart showing an operating process of a system for generating a sound corresponding to a character string according to an embodiment of the invention.

FIG. 4 is a flow chart showing an operating process of a system for generating a sound corresponding to a character string according to an embodiment of the invention.

The embodiment shown in FIG. 4 relates to a case where a sound designated by a user is combined with a SMS (Short Message Service) message and then transmitted to a mobile communication terminal of a receiver, in mobile communication environments. As can be seen from FIGS. 2 to 4, a user prepares a message with the message input unit 110 of the transmitting terminal 100 (S1) and then sets a type of the message with a sound message service (S2).

When a user sets a type of the message with a sound message service, the SMS message, a caller ID (number) and a receiver number are transmitted to a switch server (not shown) through a wireless Internet communication network of a mobile communication service provider for which the user subscribes. The user authentication unit 200 of the switch server checks whether the user is a subscriber of the sound message service through the user database 210 that stores the information of the subscribers (S3).

At this time, when a user who is not a subscriber connects to the server, it is notified that the service is a pay service on which an additional charge is imposed (S4). Then, an electronic settlement service is connected, thereby informing the user that a settlement should be made so as to use the service (S5).

Following the above processes, when the transmitting terminal 100 transmits the characters, the system for generating sound corresponding to a character string, which, based on character strings that are generated by a character input device of the mobile communication terminal, enables the 12 (twelve) scales of various music, musical instruments, effect sounds, voices and the like to correspond to sound sources embedded in the mobile communication terminal and thus generates a sound as a meaning delivering matter such as chord, receives the characters in the sound generating means 300, which are transmitted from the transmitting terminal 100 via the communication network.

When the message receiving unit 310 receives the message that is inputted through the message input unit 110 of the transmitting terminal 100, the sound generating means 300 stores the received message in the message storage unit 320, and the character string selection unit 330 retrieves character strings for the message stored in the message storage unit 320 from the character string database 331 and selects a character string that can be converted into a sound (S6).

Here, the character string, which can be converted into a sound in the character string selection unit 330, is stored in the character string database 331. The character string database 331 is updated by a sound message service provider whenever there is a sound for a new character string.

Regarding the character string selected in the character string selection unit 330, the sound setting unit 340 retrieves sounds stored in the sound database 350 and selects a sound that a user wants for the selected character string (S7).

Here, the sound database 350 comprises a basic sound database 351 that stores sounds, which are basically provided by a sound message service provider, and a user-dedicated sound database 352 that stores sounds provided by a sound contents provider and sounds made by users.

Accordingly, a user who wants to set a sound, which is attached to a message to be transmitted, can select one of the sounds corresponding to character strings of the message, which are stored in the basic sound database 351. Alternatively, the user may select a sound from the user-dedicated sound database 352 that stores the charged sounds, which are provided by the sound contents provider, or the user-dedicated sounds, which are made and uploaded by the user using a computer and the like.

Here, the sounds to be stored in the user-dedicated sound database 352 should be stored in such a manner that the sounds are matched with the respective character strings stored in the character string database 331.

To be more specific, the user-dedicated sound database 352 is connected to a wireless Internet for a mobile communication terminal or a server on a web. Accordingly, a sound message service subscriber can connect to the wireless Internet or web to store various musical instrument sounds such as piano and violin or foreign languages such as Korean, English and Japanese for any one character string of the character string list stored in the character string database 331, alternatively, may store various sounds such as a series of melodies, chords, music clips and the like, depending on the messages. Furthermore, even for special characters such as emoticon, the service subscriber can store various musical instrument sounds, laughs, moans and the like through an arrangement operation, for example.

It is preferable that when the service subscriber does not separately select a sound corresponding to a character string, a sound, which is basically set in the sound setting unit 340, is attached to a message to be transmitted.

For example, for a case where a character string of "Love" is selected in the character string selection unit 330 and a sound corresponding to the character string is set, a sound "Love" of a woman voice stored in the basic sound database 351 may be set. Alternatively, a sound of "I Love You", which a service subscriber has recorded and uploaded a speech of a specific actor in a movie, or the words of "Love" in a popular song, which the subscriber has uploaded, may be selected and set from the user-dedicated sound database 352.

Since the various sounds for one character string are stored in the sound database 350, the sound setting unit 340 can variously change tone colors for the same character string.

Regarding the sounds set in the sound setting unit 340, the sound combination unit 360 sets an order of the sounds to combine the sounds for the message stored in the message storage unit 310.

Regarding the order of sounds combined in the sound combination unit 360, the sound time adjusting unit 370 calculates start time for outputting the sound and sound duration time between the character strings, thereby matching the selected sound with the character string of the message (S8).

Then, the message and sound confirmation unit 380 enables the user to pre-listen the sound matched in the sound combination unit 360 and the sound time adjusting unit 370 (S9). When a sound for a message, which the user intends to express, is embodied, the message and sound transmit unit 390 transmits the sound (S10). When the user is not satisfied with the sound, a sound for the character string is again selected. In other words, until a desired sound for the prepared message is retrieved, the sound selection (S7) for the character string, the sound matching for the character string (S8) and the pre-listening (S9) are repeated. When the processes are completed, a message having a desired sound is transmitted to the receiving terminal 400 using the communication network.

Hence, when the receiving terminal 400 receives the message and sound from the transmitting terminal 100 through the sound generating means 300, a user of the receiving terminal 300 can check the received message and simultaneously listen to the sound corresponding to the character string of the message through a speaker.

In addition, the invention can be applied to a messenger model of a computer environment.

To be more specific, first, a user subscribes for the sound message service. Then, when the user inputs a message on a dialogue window of a messenger using a computer terminal, which a messenger program is installed therein and which is capable of connecting to the Internet and enables the user to perform a web chatting, the inputted message is transmitted to a web server connected to the network. In the sound generating means, a sound corresponding to the message is extracted and synthesized, so that the message is displayed on a display window of a receiving computer terminal and the corresponding sound effects are simultaneously outputted through a speaker.

Considering the situation where the dialogue using the messenger is rapidly progressed, the sound is not set for each message, contrary to the service using the mobile communication terminal. In other words, a user sets sounds corresponding to character strings in advance. Then, when a user transmits a message through a messenger window, the sound generating means transmits the message together with the preset sound corresponding to the character string of the message.

While the invention has been shown and described with reference to certain preferred embodiments thereof, it will be understood by those skilled in the art that various changes in form and details may be made thereto without departing from the spirit and scope of the invention as defined by the appended claims.

What is claimed is:

1. A system for generating various sounds corresponding to character strings inputted in a mobile communication terminal or computer terminal, the system comprising:
   a message input unit configured to input a character message in a transmitting terminal;
   a message setting unit configured to set outputting of the character message as a sound message;
   a user authentication unit connected to a communication network, the user authentication unit being configured to confirm whether a user is a service subscriber or not when the message setting unit sets the character message as the sound message;
   a user database associated with the user authentication unit, the user database being configured to store information of the user therein;
   a sound generator configured to receive the character message inputted through the message input unit, the sound generator being configured to generate sound corresponding to the character message and transmit the character message and the sound to a receiving terminal when the user is confirmed as a service subscriber by the user authentication unit; and
   a receiving terminal configured to receive the character message and the sound transmitted from the sound generator via a communication network,
   wherein the sound generator comprises
      a message receiving unit configured to receive the character message,
      a message storage unit configured to store the character message received by the message receiving unit,
      a character string selection unit configured to select a character string which can be converted to sound from the character strings stored in the message storage unit, a character string database configured to store information of the character strings to be selected by the character string selection unit, a sound setting unit configured to retrieve and set a sound to be matched with the character string selected by the character string selection unit, the sound setting unit having means for setting various tone colors for one character string, a sound database including the sound matched with the character string set by the sound setting unit, a sound combination unit configured to combine the sound with the character string in the order of the character string, the sound being set by the sound setting unit, a sound time adjusting unit configured to adjust a start time and duration of an output of the sound combined by the sound combination unit, a message and sound confirmation unit configured to enable the user to listen to the sound adjusted by the sound time adjusting unit so as to confirm that the sound matches the character message, and a character and sound transmitting unit configured to transmit the character message and the sound confirmed by the message and sound confirmation unit, to the receiving terminal.

2. The system according to claim 1, wherein the user authentication unit is connected to an electronic settlement service.

3. The system according to claim 1, wherein the sound database comprises a basic sound database and a user-dedicated sound database.

4. The system according to claim 3, wherein the user-dedicated sound database stores sounds provided by a sound contents provider or sounds made by users.

* * * * *